US012776720B2

(12) United States Patent
Yang et al.

(10) Patent No.: US 12,776,720 B2
(45) Date of Patent: Oct. 27, 2026

(54) CONTROL CIRCUIT AND METHOD FOR ISOLATED SWITCHING-MODE CONVERTER

(71) Applicant: SHANGHAI BRIGHT POWER SEMICONDUCTOR CO., LTD., Shanghai (CN)

(72) Inventors: Pengbo Yang, Shanghai (CN); Liqiang Hu, Shanghai (CN); Zhen Zhu, Shanghai (CN); Yanmei Guo, Shanghai (CN); Shuai Wu, Shanghai (CN); Qinyuan Tian, Shanghai (CN); Fengfan Zhang, Shanghai (CN)

(73) Assignee: SHANGHAI BRIGHT POWER SEMICONDUCTOR CO., LTD., Shanghai (CN)

(*) Notice: Subject to any disclaimer, the term of this patent is extended or adjusted under 35 U.S.C. 154(b) by 153 days.

(21) Appl. No.: 18/972,505

(22) Filed: Dec. 6, 2024

(65) Prior Publication Data

US 2025/0192687 A1 Jun. 12, 2025

(30) Foreign Application Priority Data

Dec. 12, 2023 (CN) ......................... 202311708846.6

(51) Int. Cl.
*H02M 3/335* (2006.01)
*H02M 1/00* (2006.01)

(52) U.S. Cl.
CPC ..... *H02M 3/33592* (2013.01); *H02M 1/0009* (2021.05)

(58) Field of Classification Search
CPC ........... H02M 3/33592; H02M 1/0009; H02M 1/0048; H02M 1/08; H02M 1/32; H02M 3/157
See application file for complete search history.

(56) References Cited

U.S. PATENT DOCUMENTS

| | | | | |
|---|---|---|---|---|
| 11,728,736 | B2 * | 8/2023 | Kong | H02M 3/33584 363/21.12 |
| 2018/0062530 | A1 * | 3/2018 | Kong | H02M 1/08 |
| 2021/0408926 | A1 * | 12/2021 | Feng | H02J 7/42 |
| 2023/0006565 | A1 * | 1/2023 | Zhang | H02M 3/33592 |

* cited by examiner

*Primary Examiner* — Yemane Mehari
(74) *Attorney, Agent, or Firm* — MUNCY, GEISSLER, OLDS & LOWE, P.C.

(57) ABSTRACT

A control circuit and method for an isolated switching-mode converter are disclosed. In the control circuit, in preparation for turning on a primary transistor switch in a primary-side circuit, preferably, a secondary-side controller transmits an inquiry signal to a primary-side controller, and the primary-side controller transmits, after confirming that it has been prepared, a feedback signal to the secondary-side controller to allow the secondary-side controller to confirm that the primary transistor switch has been turned off. After that, the primary-side controller turns on the primary transistor. In other words, in the control circuit and method of the present invention, in preparation for turning on the primary transistor switch, information exchange is conducted between the primary and secondary sides to make sure that the primary transistor switch is turned on after the synchronous rectifier transistor is turned off.

20 Claims, 2 Drawing Sheets

CONTROL CIRCUIT AND METHOD FOR ISOLATED SWITCHING-MODE CONVERTER

CROSS-REFERENCE TO RELATED APPLICATION

This application claims the priority of Chinese patent application number 202311708846.6, filed on Dec. 12, 2023 and entitled "CONTROL CIRCUIT AND METHOD FOR ISOLATED SWITCHING-MODE CONVERTER", the entire contents of which are incorporated herein by reference.

TECHNICAL FIELD

The present invention relates to the field of electronic circuits, and in particular to a control circuit and method for an isolated switching-mode converter.

BACKGROUND

With the rapid development of large-scale and very-large-scale integrated circuits, small and efficient isolated switching-mode converters have been widely used in various power supply systems. An isolated switching-mode converter typically includes a primary-side circuit and a secondary-side circuit, and a stable output of the secondary-side circuit can be obtained by controlling turn-on and turn-off of a power switch in the primary-side circuit. In addition, during operation of the isolated switching-mode converter, it is necessary to interlock turn-on of a power transistor switch in the primary-side circuit with a synchronous rectifier transistor in the secondary-side circuit to prevent common conduction of the primary-side and secondary-side circuits. However, in practical use, there remains a chance of common conduction of the primary-side and secondary-side circuits caused, for example, by false turn-on of the synchronous rectifier transistor in the secondary-side circuit.

Therefore, there is a need for a control circuit and method for preventing common conduction of primary-side and secondary-side circuits in an isolated switching-mode converter and thereby improving its safety performance and reliability.

SUMMARY OF THE INVENTION

It is an object of the present invention to provide a control circuit for an isolated switching-mode converter, which overcomes the problem of possible cross-conduction of primary-side and secondary-side circuits arising from the use of conventional isolated switching-mode converters.

To this end, the present invention provides a control circuit for controlling an isolated switching-mode converter. The isolated switching-mode converter comprising a primary-side circuit, a secondary-side circuit and a transformer coupled between the primary-side and secondary-side circuits. The control circuit comprises: a primary-side controller that comprises an output terminal electrically connected to a control terminal of a primary transistor switch in the primary-side circuit and is configured to output a control signal for the primary transistor switch; and a secondary-side controller that comprises an output terminal electrically connected to a control terminal of a synchronous rectifier transistor in the secondary-side circuit and is configured to output a control signal for the synchronous rectifier transistor, wherein the primary-side controller transmits a feedback signal to the secondary-side controller when receiving an inquiry signal from the secondary-side controller, wherein the secondary-side controller keeps the synchronous rectifier transistor turned off based on the feedback signal, and wherein the primary-side controller turns on the primary transistor switch in the primary-side circuit after the synchronous rectifier transistor is turned off.

Optionally, the secondary-side controller may be further configured to transmit a first indication signal to the primary-side controller after keeping the synchronous rectifier transistor turned off based on the feedback signal, thereby prompting the primary-side controller to control the primary transistor switch to be turned on.

Optionally, the secondary-side controller may be further configured to receive an output voltage of the isolated switching-mode converter and to transmit the first indication signal after it receives the feedback signal and when the output voltage of the switching-mode converter is below a predetermined voltage.

Optionally, the primary-side controller may be configured to turn on the primary transistor switch after a second predefined period of time following transmission of the feedback signal, wherein the second predefined period of time ends later than a time when the synchronous rectifier transistor is turned off.

Optionally, the primary-side controller may be further configured to transmit a second indication signal when the primary transistor switch is turned off, thereby prompting the secondary-side controller to control the synchronous rectifier transistor to be turned on.

Optionally, the secondary-side controller may be further configured to detect a voltage signal from a secondary-side winding in the transformer and to turn on the synchronous rectifier transistor when the voltage signal from the secondary-side winding drops to a predetermined value as a result of the primary transistor switch being turned off.

Optionally, the secondary-side controller may be further configured to detect a secondary current in the secondary-side circuit and to turn off the synchronous rectifier transistor when detecting that the secondary current drops to a first preset current during conduction of the synchronous rectifier transistor.

Optionally, the secondary-side controller may comprise a first logic control module, a first transmitter module and a first receiver module, wherein: a first output terminal of the first logic control module is electrically connected to the control terminal of the synchronous rectifier transistor and is configured to provide the control signal to the synchronous rectifier transistor; a second output terminal of the first logic control module is electrically connected to the first transmitter module and is configured to transmit a generated signal to the primary-side controller via the first transmitter module; and the first input terminal of the first logic control module is also electrically connected to the first receiver module and is configured to receive a signal from the primary-side controller via the first receiver module.

Optionally, the primary-side controller may comprise a second logic control module, a second receiver module and a second transmitter module, wherein: an input terminal of the second logic control module is connected to the second receiver module and is configured to receive a signal from the secondary-side controller via the second receiver module; a first output terminal of the second logic control module is electrically connected to the control terminal of the primary transistor switch and is configured to provide the control signal to the primary transistor switch; and a second output terminal of the second logic control module is electrically connected to the second transmitter module and is configured to transmit a generated signal to the secondary-side controller via the second transmitter module.

Optionally, the control circuit may further comprise at least one isolator coupled between the primary-side controller and the secondary-side controller and configured to transmit signals from the secondary-side controller to the primary-side controller, and from the primary-side controller to the secondary-side controller.

Optionally, the control circuit may further comprise a first isolator and a second isolator, both coupled between the primary-side controller and the secondary-side controller, the first isolator configured to couple a signal from the secondary-side controller to the primary-side controller, the second isolator configured to couple a signal from the primary-side controller to the secondary-side controller.

The present invention also provides a control method for an isolated switching-mode converter comprising a primary-side circuit, a secondary-side circuit and a transformer coupled between the primary and secondary-side circuits. The control method comprises: at the secondary-side controller, transmitting an inquiry signal to the primary-side controller; at the primary-side controller, after receiving the inquiry signal, transmitting a feedback signal to the secondary-side controller; at the secondary-side controller, receiving the feedback signal and providing a turn-off signal to a synchronous rectifier transistor in the secondary-side circuit, thereby keeping the synchronous rectifier transistor turned off; and at the primary-side controller, after the synchronous rectifier transistor is turned off, providing a turn-on signal to a primary transistor switch in the primary-side circuit, thereby turning on the primary transistor switch.

Optionally, the secondary-side controller may transmit a first indication signal to the primary-side controller after keeping the synchronous rectifier transistor turned off based on the feedback signal, wherein the primary-side controller may then turn on the primary transistor switch based on the first indication signal.

Optionally, the secondary-side controller may further receive an output voltage of the isolated switching-mode converter and transmit the first indication signal after it receives the feedback signal and when the output voltage of the switching-mode converter is below a predetermined voltage.

Optionally, the primary-side controller may provide, a turn-on signal to the primary transistor switch after a second predefined period of time following transmission of the feedback signal, thereby turning on the primary transistor switch, wherein the second predefined period of time ends later than a time when the synchronous rectifier transistor is turned off.

Optionally, the primary-side controller may transmit a second indication signal when the primary transistor switch is turned off, and the secondary-side controller may provide a turn-on signal to the synchronous rectifier transistor based on the second indication signal, thereby turning on the synchronous rectifier transistor.

Optionally, the secondary-side controller may detect a voltage signal from a secondary-side winding in the transformer and provide a turn-on signal to the synchronous rectifier transistor when the voltage signal from the secondary-side winding drops to a predetermined value as a result of the primary transistor switch being turned off, thereby turning on the synchronous rectifier transistor.

Optionally, the secondary-side controller may further detect a secondary current in the secondary-side circuit and turn off the synchronous rectifier transistor when detecting that the secondary current drops to a first preset current during conduction of the synchronous rectifier transistor.

Optionally, in DCM operation of the isolated switching-mode converter, the method may comprise: at the secondary-side controller, transmitting the inquiry signal to the primary-side controller, in preparation for starting a new switching period; at the primary-side controller, after receiving the inquiry signal, transmitting the feedback signal to the secondary-side controller; at the secondary-side controller, after receiving the feedback signal, keeping the synchronous rectifier transistor turned off and transmitting a first indication signal to the primary-side controller when detecting that an output voltage of the isolated switching-mode converter drops to a predetermined voltage; at the primary-side controller, receiving the first indication signal and turning on the primary transistor switch, thereby starting the current switching period; at the primary-side controller, upon a primary current in the primary-side circuit increasing to a second preset current, controlling the primary transistor switch to be turned off and transmitting a second indication signal; at the secondary-side controller, after receiving the second indication signal, controlling the synchronous rectifier transistor to be turned on; and at the secondary-side controller, after demagnetization of the secondary-side circuit is complete, controlling the synchronous rectifier transistor to be turned off, getting ready for starting the next switching period.

In the control circuit of the present invention, in preparation for turning on the primary transistor switch in the primary-side circuit, preferably, the secondary-side controller transmits an inquiry signal to the primary-side controller, and the primary-side controller transmits, after confirming that it has been prepared, a feedback signal to the secondary-side controller to allow the secondary-side controller to keep the synchronous rectifier transistor turned off based on the feedback signal. After that, the primary-side controller turns on the primary transistor. In other words, in the control circuit and method of the present invention, in preparation for turning on the primary transistor switch, information exchange is conducted between the primary and secondary sides to ensure that the primary transistor switch is turned on after the synchronous rectifier transistor is turned off. This prevents false turn-on of the synchronous rectifier transistor while the primary transistor switch is being in an ON state, which may lead to cross-conduction of the primary and secondary sides. Therefore, the risk of common conduction of the primary and secondary sides can be effectively reduced.

Further, in practical applications, one or more magnetic, capacitive, digital or other isolators may be used between the primary-side and secondary-side controllers in the control circuit of the present invention, which enable two-way communication between the primary and secondary sides, resulting in faster response and lower system power consumption.

DETAILED DESCRIPTION

Control circuits and methods for an isolated switching-mode converter according to the present invention will be described in greater detail below with reference to the accompanying drawings, which illustrate specific embodiment thereof. From the following description, advantages and features of the invention will become more apparent. Note that the figures are provided in a very simplified form not necessarily drawn to exact scale for the only purpose of helping to explain the disclosed embodiments in a more convenient and clearer way. As used herein, the terms "time", "conduction time period" and "conduction time" each refer to a period of time, and the terms "instant", "when" and "turn-off time" each refer to a point of time at which an event occurs. As used herein, the terms "valid level" and "high level" each refer to an electrical level indicative of an action to be taken by a designated element or module, which is detectable and determined to be valid, and the terms "invalid level" and "low level" each refer to an electrical level indicative of an action to be taken by a designated element or module, which is detectable but determined to be invalid, or is undetectable. The term "signal" refers to an electrical/magnetic signal, which can be represented by a particular waveform, or refers to information transmitted in a circuit, which can be represented by a particular value.

Figure 1:
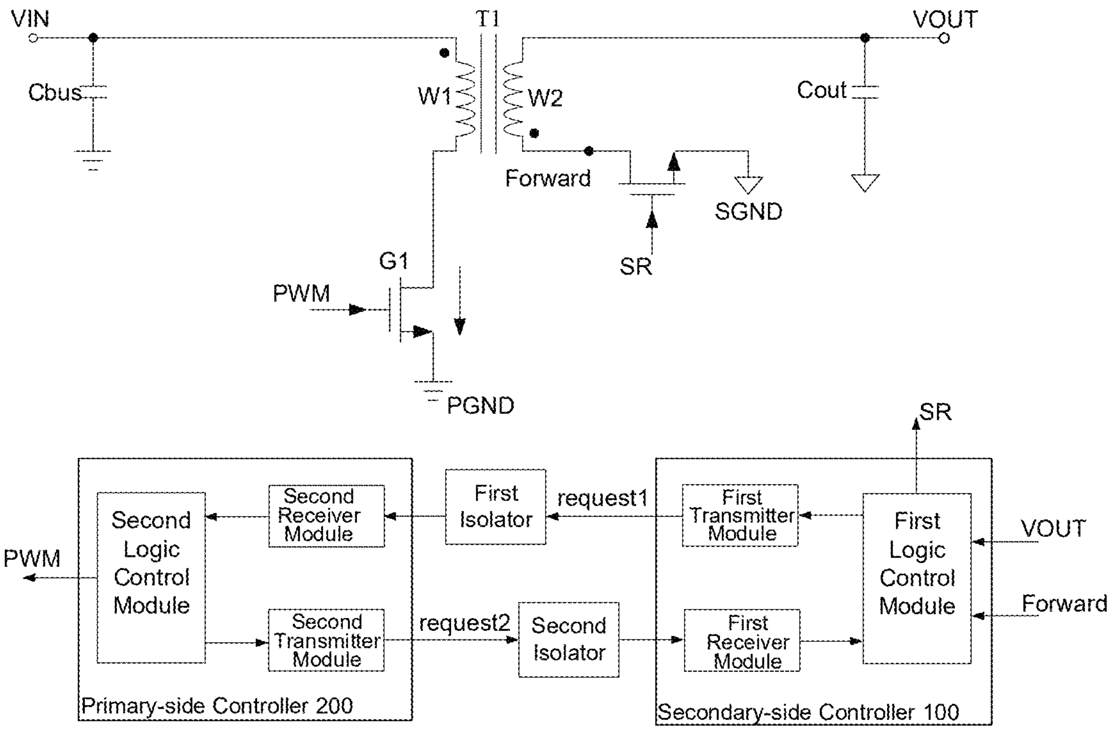
FIG. 1 is a schematic circuit diagram of an isolated switching-mode converter coupled to a control circuit according to an embodiment of the present invention.

FIG. 1 is a schematic circuit diagram of an isolated switching-mode converter coupled to a control circuit according to an embodiment of the present invention. As shown in FIG. 1, the isolated switching-mode converter includes a primary-side circuit, a secondary-side circuit and a transformer T1 coupled between the primary and secondary-side circuits to provide electrical isolation. The electrically isolated primary-side and secondary-side circuits are connected to different ground terminals. The transformer T1 includes a primary-side winding W1 and a secondary-side winding W2. The primary-side circuit is coupled to the primary-side winding W1 in the transformer T1, and the secondary-side circuit is coupled to the secondary-side winding W2 in the transformer T1.

With continued reference to FIG. 1, the control circuit includes a primary-side controller 200 and secondary-side controller 100. The primary-side controller 200 comprises an output terminal that is electrically connected to a control terminal of a primary transistor switch G1 in the primary-side circuit and is configured to output a control signal PWM for the primary transistor switch G1, which can turn on or turn off the primary transistor switch G1. The secondary-side controller 100 comprises an output terminal that is electrically connected to a control terminal of a synchronous rectifier transistor SR in the secondary-side circuit and is configured to output a control signal for the synchronous rectifier transistor SR, which can turn on or turn off the synchronous rectifier transistor SR. In other words, the primary-side controller 200 can be used to turn on and turn off the primary transistor switch G1, and the secondary-side controller 100 can be used to turn on and turn off the synchronous rectifier transistor SR.

In one example, the primary-side circuit may include an input capacitor Cbus and the primary transistor switch G1. A first terminal of the input capacitor Cbus is coupled to the primary-side winding W1 of the transformer T1, and a second terminal of the input capacitor Cbus is connected to the ground terminal for the primary-side circuit. For example, the primary transistor switch G1 may be a power transistor switch. A drain of the power transistor switch is connected to the primary-side winding W1 of the transformer T1. A source of the power transistor switch is connected to the ground terminal for the primary-side circuit. A gate of the power transistor switch is connected to the primary-side controller 200 in order to receive the control signal PWM for the primary transistor switch G1.

In one example, the secondary-side circuit may include the synchronous rectifier transistor SR and an output capacitor Cout. A first terminal of the output capacitor Cout is coupled to the secondary-side winding W2 of the transformer T1 and thus coupled to a load. A second terminal of the output capacitor Cout is connected to the ground terminal for the secondary-side circuit. For example, the synchronous rectifier transistor SR may be a power transistor switch. A drain of the power transistor switch is connected to the secondary-side winding W2 of the transformer T1. A source of the power transistor switch is connected to the ground terminal for the secondary-side circuit. A gate of the power transistor switch is connected to the secondary-side controller 100, in order to receive the control signal for the synchronous rectifier transistor SR.

In addition, the secondary-side controller 100 of this embodiment may also be coupled to the secondary-side winding W2 of the transformer T1, in order to receive a voltage signal Forward from the secondary-side winding W2 of the transformer T1. In specific implementations, the secondary-side controller 100 may determine whether the primary transistor switch G1 in the primary-side circuit is ON or OFF by sensing the voltage signal Forward from the secondary-side winding W2. For example, a drop of the voltage signal Forward from the secondary-side winding W2 to a predetermined value may provide an indication of an OFF state of the primary transistor switch G1.

In the control circuit of this embodiment, the primary-side controller 200 and the secondary-side controller 100 ensure, through information exchange, that the synchronous rectifier transistor SR is turned off before the primary transistor switch G1 is turned on. Similarly, it can be ensured that the synchronous rectifier transistor SR is turned on after the primary transistor switch G1 is turned off. In this way, common conduction of the primary and secondary sides can be effectively addressed.

Figure 2:
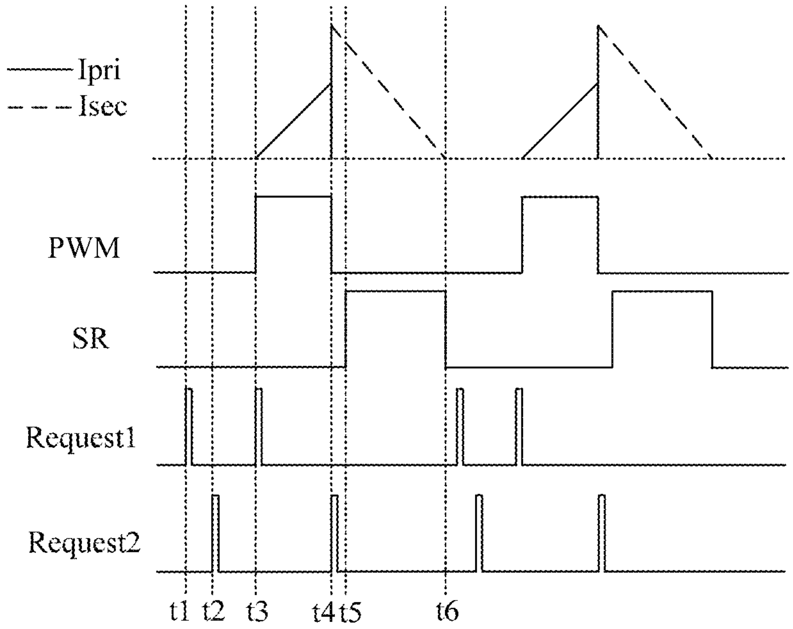
FIG. 2 is a schematic waveform diagram of key signals in DCM operation of the isolated switching-mode converter coupled to the control circuit according to an embodiment of the present invention.
Figure 3:
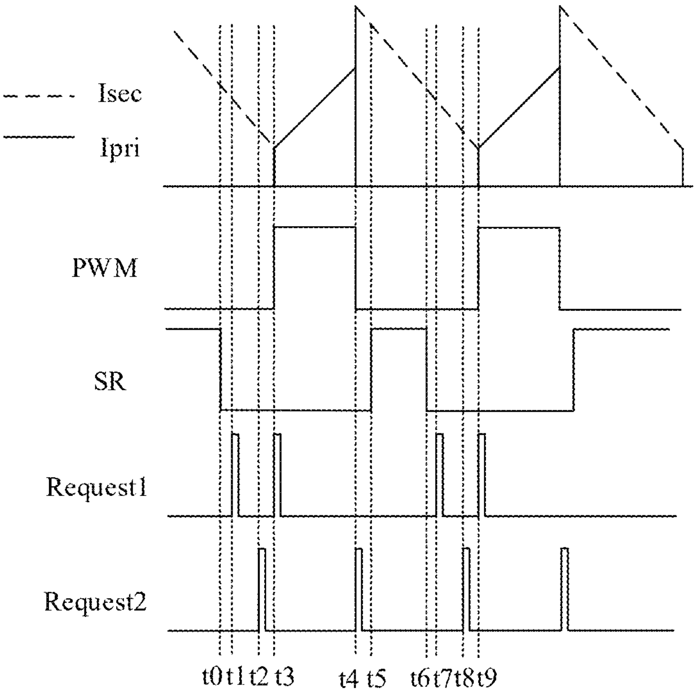
FIG. 3 is a schematic waveform diagram of key signals in CCM operation of the isolated switching-mode converter coupled to the control circuit according to an embodiment of the present invention.
Figure 4:
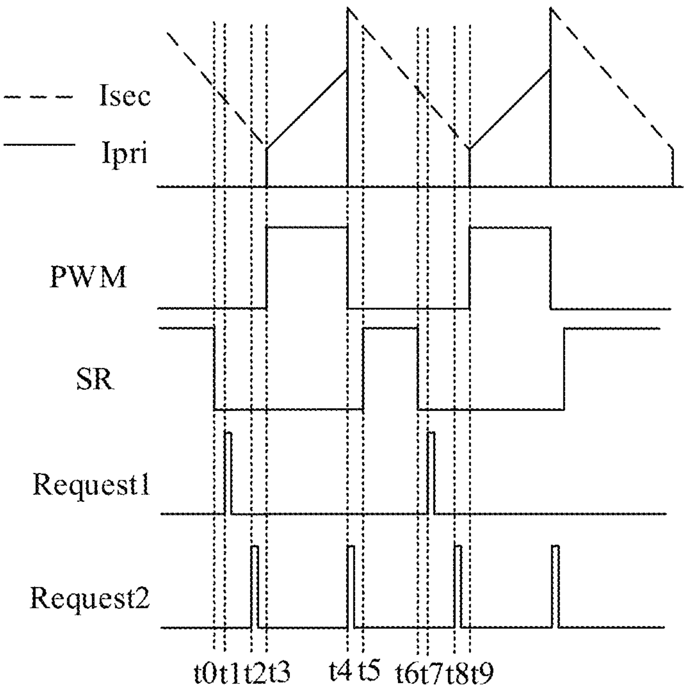
FIG. 4 is a schematic waveform diagram of key signals in CCM operation of the isolated switching-mode converter coupled to the control circuit according to an alternative embodiment of the present invention.

Specifically, in preparation for starting a new switching period, the primary-side controller 200 is configured to receive an inquiry signal request1_0 from the secondary-side controller 100 and perform a self-check (e.g., the self-check may involve checking whether the primary transistor switch G1 in the primary-side circuit has been turned off, i.e., whether it is in an OFF state; making sure that every modules in the primary-side controller 200 has been prepared; and so forth), followed by entry into a ready state. For example, as shown in FIGS. 2 to 4, at time t1, the secondary-side controller 100 transmits the inquiry signal request1_0 (represented by the first pulse in waveform Request1 of FIGS. 2 to 4; and other similar signals such as request1_1 are incremented from request1_0) to the primary-side controller 200.

Optionally, the secondary-side controller 100 may be configured to transmit the inquiry signal request1_0 after a first predefined period of time following turn-off of the synchronous rectifier transistor SR in the previous switching period, to prepare for starting a new switching period.

Additionally, the primary-side controller 200 may turn on the primary transistor switch G1 in the primary-side circuit after confirming that the synchronous rectifier transistor SR is turned off, thereby starting a new switching period. Turning on the primary transistor switch G1 in the primary-side circuit and thereby starting a new switching period by the primary-side controller 200 may include: the primary-side controller 200 performs a self-check upon receipt of the inquiry signal request1_0 and, after the self-check is completed, transmits a feedback signal request2_0 to the secondary-side controller 100, which indicates that the primary-side controller 200 has been prepared; the secondary-side controller 100 keeps the synchronous rectifier transistor SR turned off based on the feedback signal request2_0; and then the primary-side controller 200 turns on the primary transistor switch G1 in the primary-side circuit. For example, as shown in FIGS. 2 to 4, at t2, the primary-side controller 200 may complete the self-check and transmit the feedback signal request2_0 (represented by the first pulse in waveform Request2 of FIGS. 2 to 4; and other similar signals such as request2_1 are incremented from request2_0) to the secondary-side controller 100, and in response, the secondary-side controller 100 may still keep the synchronous rectifier transistor SR in the off state.

How the primary-side controller 200 ensures that the primary transistor switch G1 is turned on after the synchronous rectifier transistor SR is turned off is described below by ways of several specific examples.

In a first example, when ensuring that the synchronous rectifier transistor SR remains in the off state, the secondary-side controller 100 is further configured to transmit a first indication signal request1_1 to the primary-side controller 200, prompting the primary-side controller 200 to turn on the primary transistor switch G1 in the primary-side circuit based on the first indication signal request1_1. In other words, in this example, the primary-side controller 200 controls the timing of turning on the primary transistor switch G1 based on the first indication signal request1_1. Once the primary-side controller 200 receives the first indication signal request1_1, it confirms that the synchronous rectifier transistor SR is turned off. Accordingly, the primary transistor switch G1 can be controlled to be turned on. In this way, the problem of common conduction of the primary and secondary sides can be effectively circumvented. For example, as shown in FIGS. 2 and 3, at t3, after confirming that the synchronous rectifier transistor SR is turned off, the secondary-side controller 100 transmits the first indication signal request1_1 to the primary-side controller 200. In response, the primary-side controller 200 turns on the primary transistor switch G1 in the primary-side circuit based on the first indication signal request1_1.

In this first example, after ensuring that the synchronous rectifier transistor SR is kept turned off, the secondary-side controller 100 may also be configured to determine the timing of transmitting the first indication signal request1_1 based on an output voltage Vout of the switching-mode converter. Specifically, after receiving the feedback signal request2_0 and accordingly turning off the synchronous rectifier transistor SR, the secondary-side controller 100 may transmit the first indication signal request1_1 upon the output voltage Vout of the switching-mode converter being below a predetermined voltage, prompting the primary-side controller 200 to control the primary transistor switch G1 to be turned on. For example, as shown in FIGS. 2 and 3, the secondary-side controller 100 may keep the synchronous rectifier transistor SR turned off based on the feedback signal request2_0 at t2, but transmit the first indication signal request1_1 to the primary-side controller 200 when the output voltage Vout of the switching-mode converter is below the predetermined voltage at t3.

Therefore, the secondary-side controller 100 generates the inquiry signal request1_0 after the first predefined period of time following turn-off of the synchronous rectifier transistor SR in the previous switching period. At this time, if the secondary-side controller 100 receives the feedback signal request2_0, it accordingly turns off the synchronous rectifier transistor SR. After that, secondary-side controller 100 waits for the output voltage Vout of the switching-mode converter fall below the predetermined voltage, and then transmits the first indication signal request1_1.

In a second example, the primary-side controller 200 may turn on the primary transistor switch G1 in the primary-side circuit after a second predefined period of time following transmission of the feedback signal request2_0. Here, the second predefined period of time ends later than a time when the synchronous rectifier transistor SR is turned off, ensuring that the primary transistor switch G1 is turned on after the synchronous rectifier transistor SR is turned off. In other words, in this example, the primary-side controller 200 reserves a period of time, after it transmits the feedback signal request2_0, for the secondary-side controller 100 to turn off the synchronous rectifier transistor SR, and then turns on the primary transistor switch G1. This can also effectively circumvent the problem of common conduction of the primary and secondary sides. For example, as shown in FIG. 4, the primary-side controller 200 may transmit the feedback signal request2_0 at t2 and turn on the primary transistor switch G1 at t3, and the synchronous rectifier transistor SR may be turned off at a time earlier than t3.

In addition, once the primary transistor switch G1 is turned on, a primary current Ipri in the primary-side circuit will ramp up. In specific examples, the primary-side controller 200 may turn off the primary transistor switch G1 when the primary current Ipri rises to a second preset current. Further, after confirming that the primary transistor switch G1 is turned off, the secondary-side controller 100 may control the synchronous rectifier transistor SR in the secondary-side circuit to be turned on. For example, as shown in FIGS. 2 to 4, the primary transistor switch G1 may be turned off in response to the primary current Ipri rising to the second preset current at t4, and the synchronous rectifier transistor SR may be turned on at t5.

How the secondary-side controller 100 ensures that the primary transistor switch G1 is turned off and subsequently turns on the synchronous rectifier transistor SR is described below by ways of several specific examples.

In one example, the primary-side controller 200 is further configured to transmit a second indication signal request2_1 when the primary transistor switch G1 is turned off, prompting the secondary-side controller 100 to turn on the synchronous rectifier transistor SR when receiving the second indication signal request2_1. In other words, in this example, the secondary-side controller 100 controls the timing of turning on the synchronous rectifier transistor SR based on the second indication signal request2_1. Receipt of the second indication signal request2_1 by the secondary-side controller 100 indicates that it is confirmed that the primary transistor switch G1 has been turned off. Accordingly, the synchronous rectifier transistor SR can be turned on. In this way, the problem of common conduction of the primary and secondary sides can be effectively circumvented. For example, as shown in FIGS. 2 to 4, at t4, the primary current Ipri may rise to second preset current. In response, the primary transistor switch G1 may be turned off, and the second indication signal request2_1 may be transmitted. The secondary-side controller 100 may turn on the synchronous rectifier transistor SR later at t5.

In another example, the secondary-side controller 100 may also be configured to detect the voltage signal Forward from the secondary-side winding W2 and turn on the synchronous rectifier transistor SR when the voltage signal Forward from the secondary-side winding W2 drops to the predetermined value as a result of the primary transistor switch G1 being turned off. In other words, in this example, the secondary-side controller 100 detects the voltage signal Forward from the secondary-side winding W2 by itself, and turns on the synchronous rectifier transistor SR in response to a drop of the voltage signal Forward from the secondary-side winding W2 to the predetermined value, which indicates that the primary transistor switch G1 has been turned off. This can also effectively circumvent the problem of common conduction of the primary and secondary sides.

In specific examples, after the synchronous rectifier transistor SR is turned on, the secondary-side controller 100 may continue detecting a secondary current Isec in the secondary-side circuit in real time. Moreover, when the secondary current Isec decreases to a first preset current, the secondary-side controller 100 may provide a turn-off signal to the synchronous rectifier transistor SR, in order to turn off the synchronous rectifier transistor SR.

It is noted that the control circuit of this disclosure may be suitably used with the isolated switching-mode converter, whether it operates in a continuous conduction mode (CCM), or in a discontinuous conduction mode (DCM).

A particular structural implementation of the control circuit is described in detail below with continued reference to FIG. 1.

As shown in FIG. 1, the secondary-side controller 100 may particularly include a first logic control module, a first transmitter module and a first receiver module.

A first output terminal of the first logic control module is electrically connected to the control terminal of the synchronous rectifier transistor SR, in order to provide the control signal to the synchronous rectifier transistor SR. A second output terminal of the first logic control module is electrically connected to the first transmitter module, in order to allow a generated signal to be transmitted out by the first transmitter module. For example, the first logic control module may generate the inquiry signal request1_0, which may be transmitted by the first transmitter module.

A first input terminal of the first logic control module is electrically connected to the first receiver module, in order to receive signals request2 from the primary-side controller 200 via the first receiver module. For example, the feedback signal request2_0 may be received from the primary-side controller 200 via the first receiver module to instruct the first logic control module not to provide a turn-on signal to the synchronous rectifier transistor SR when receiving the feedback signal request2_0, ensuring that the synchronous rectifier transistor SR remains turned off. Moreover, the second indication signal request2_1 may also be received from the primary-side controller 200 via the first receiver module, prompting the first logic control module to generate a turn-on signal for the synchronous rectifier transistor SR based on the second indication signal request2_1.

Optionally, in addition to confirming that the synchronous rectifier transistor SR is kept turned off based on the feedback signal request2_0, the first logic control module may also be configured to generate the first indication signal request1_1 and transmit it to the primary-side controller 200 via the first transmitter module, prompting the primary-side controller 200 to control the primary transistor switch G1 to be turned on.

The first logic control module may further have a second input terminal, which may be electrically connected to an output terminal of the secondary-side winding W2 of the transformer T1, in order to receive the voltage signal Forward from the secondary-side winding W2. In specific examples, the first logic control module may be configured to generate the turn-on signal for the synchronous rectifier transistor SR based on the voltage signal Forward. For example, it may generate the turn-on signal for the synchronous rectifier transistor SR when detecting that the voltage signal Forward drops to the predetermined value as a result of the primary transistor switch G1 being turned off. In the present embodiment, the first logic control module also has a third input terminal further configured to receive the output voltage Vout of the switching-mode converter. In one example, the first logic control module may take the output voltage Vout as a basis for determining the time of generating the first indication signal request1_1. For example, after receiving the feedback signal request2_0, the first logic control module may wait for the received output voltage Vout to fall below the predetermined voltage before generating the first indication signal request1_1.

With continued reference to FIG. 1, the primary-side controller 200 may particularly include a second logic control module, a second receiver module and a second transmitter module.

An input terminal of the second logic control module is connected to the second receiver module, in order to receive signals request from the secondary-side controller 100 through the second receiver module, such as the inquiry signal request1_0 and the first indication signal request1_1. A first output terminal of the second logic control module is electrically connected to the control terminal of the primary transistor switch G1, in order to provide the control signal PWM to the primary transistor switch G1. For example, the second logic control module may provide the turn-on signal to the primary transistor switch G1 when receiving the first indication signal request1_1. A second output terminal of the second logic control module is electrically connected to the second transmitter module, in order to transmit the generated information to the second transmitter module. The second transmitter module may then in turn send the information out. For example, the second logic control module may generate the feedback signal request2_0 after a self-check is completed, which may be then sent out by the second transmitter module. Additionally, the second logic control module may generate the second indication signal request2_1 after the primary transistor switch G1 is turned off, which may be then sent out by the second transmitter module.

In specific examples, the control circuit further includes an isolator coupled between the primary-side controller 200 and the secondary-side controller 100 and configured to isolate the primary-side controller 200 from the secondary-side controller 100. Additionally, the secondary-side controller 100 and the primary-side controller 200 may exchange information via the isolator. That is, through the isolator, signals may be transmitted from the secondary-side controller 100 to the primary-side controller 200, and from the primary-side controller 200 to the secondary-side controller 100.

In one example, the control circuit may include a single isolator, wherein the primary-side controller 200 and the secondary-side controller 100 exchange information via the single isolator. In an alternative example, for example, as shown in FIG. 1, the control circuit may include a first isolator and a second isolator. The first isolator is configured to couple signals request1 from the secondary-side controller 100 to the primary-side controller 200, and the second isolator is configured to couple signals request2 from the primary-side controller 200 to the secondary-side controller 100. It will be recognized that only one isolator may be provided in alternative examples and the isolator may be time-division multiplexed to transmit signals from the secondary-side controller 100 to the primary-side controller 200, and from the primary-side controller 200 to the secondary-side controller 100. The first and second isolators may be both implemented as, for example, magnetic isolator, capacitive isolator, digital isolator or other isolators.

Three embodiments of the control method for the isolated switching-mode converter according to the present invention, which can be implemented by the control circuit as defined above, are described in detail below.

Embodiment 1

In a first embodiment, the isolated switching-mode converter operates in a discontinuous conduction mode (DCM). A complete switching period is described below.

This can be specifically illustrated based on FIG. 1 in conjunction with the waveforms of the key signals shown in FIG. 2. It is noted that, in FIG. 2, Request1 represents a signal from the secondary-side controller 100, and Request2 represents a signal from the primary-side controller 200.

At t1, the secondary-side controller 100 may transmit an inquiry signal request1_0 to the primary-side controller 200 via the first isolator, to prepare for starting a new switching period. As noted above, the secondary-side controller 100 may transmit the inquiry signal request1_0 after the first predefined period of time following turn-off of the synchronous rectifier transistor SR in the previous switching period. After receiving the inquiry signal request1_0, the primary-side controller 200 carries out a self-check and enters a ready state.

At t2, in the ready state after the self-check is completed, the primary-side controller 200 may transmit a feedback signal request2_0 to the secondary-side controller 100 via the second isolator. Upon receiving the feedback signal request2_0, the secondary-side controller 100 checks if the synchronous rectifier transistor SR is turned off and ensures that the synchronous rectifier transistor SR is turned off. In this embodiment, the synchronous rectifier transistor SR is kept turned off after the secondary-side controller 100 receives the feedback signal request2_0.

At t3, the secondary-side controller 100 confirms that the synchronous rectifier transistor SR is in the turn-off state and detects that the output voltage Vout of the switching-mode converter drops to a predetermined voltage, the secondary-side controller 100 transmits a first indication signal request1_1 to the primary-side controller 200 via the first isolator, prompting the primary-side controller 200 to control the primary transistor switch G1 to be turned on.

At t4, as a result of the primary transistor switch G1 being turned on, a primary current Ipir in the primary-side circuit ramps up. Upon the primary current Ipir rising to a second preset current, the primary-side controller 200 controls the primary transistor switch G1 to be turned off and transmits a second indication signal request2_1 through the second isolator.

At t5, the secondary-side controller 100 receives the second indication signal request2_1 indicating that the primary transistor switch G1 has been turned off and responsively controls the synchronous rectifier transistor SR to be turned on.

At t6, as a result of the primary transistor switch G1 being turned off and the synchronous rectifier transistor SR being turned on, a secondary current Isec in the secondary-side circuit ramps down until completion of demagnetization of the secondary-side circuit. After that, the secondary-side controller 100 controls the synchronous rectifier transistor SR to be turned off.

At this point, the current switching period ends. Again, the secondary-side controller 100 may provide an inquiry signal request1_0 to the primary-side controller 200 after the first predefined period of time following the turn-off of the synchronous rectifier transistor SR, in order to get ready to start the next switching period.

Embodiment 2

In a second embodiment, the isolated switching-mode converter operates in a continuous conduction mode (CCM). A complete switching period is described below.

This can be specifically illustrated based on FIG. 1 in conjunction with the waveforms of the key signals shown in FIG. 3. It is noted that, in FIG. 3, Request1 represents a signal from the secondary-side controller 100, and Request2 represents a signal from the primary-side controller 200.

At t1, the secondary-side controller 100 may transmit an inquiry signal request1_0 to the primary-side controller 200 via the first isolator, to prepare for starting a new switching period. After receiving the inquiry signal request1_0, the primary-side controller 200 carries out a self-check and enters a ready state.

At t2, in the ready state after the self-check is completed, the primary-side controller 200 may transmit a feedback signal request2_0 to the secondary-side controller 100 via the second isolator, and the secondary-side controller 100 may then keep the synchronous rectifier transistor SR turned off based on the feedback signal request2_0.

At t3, after keeping the synchronous rectifier transistor SR turned off, the secondary-side controller 100 may transmit a first indication signal request1_1 to the primary-side controller 200 via the first isolator, prompting the primary-side controller 200 to control the primary transistor switch G1 to be turned on.

At t4, as a result of the primary transistor switch G1 being turned on, a primary current Ipir in the primary-side circuit ramps up. Upon the primary current Ipir rising to a second preset current, the primary-side controller 200 controls the primary transistor switch G1 to be turned off and transmits a second indication signal request2_1 through the second isolator.

At t5, upon receipt of the second indication signal request2_1, the secondary-side controller 100 turns on the synchronous rectifier transistor SR.

At t6, during the turning on of the synchronous rectifier transistor SR, the secondary-side controller 100 continues detecting a secondary current Isec in the secondary-side circuit in real time, and when the secondary current Isec decreases to a first preset current, provides a turn-off signal to the synchronous rectifier transistor SR, to turn off the synchronous rectifier transistor SR.

At t7, the secondary-side controller 100 transmits an inquiry signal request1_0 for prompting preparation for starting the next switching period. When receiving the inquiry signal request1_0, the primary-side controller 200 carries out a self-check.

At t8, in the ready state after the self-check is completed, the primary-side controller 200 transmits a feedback signal request2_0 to the secondary-side controller 100. The secondary-side controller 100 receives the feedback signal request2_0 and responsively turns off the synchronous rectifier transistor SR. At this point, the current switching period ends, and the next switching period starts.

Embodiment 3

A third embodiment differs from the first and second examples in that the primary transistor switch G1 is turned on after a second predefined period of time following transmission of a feedback signal request2_0 by the primary-side controller 200. In contrast, in the first and second embodiments, the primary transistor switch G1 is turned on after the secondary-side controller 100 transmits a first indication signal request1_1.

In particular, this can be illustrated based on FIG. 1 in conjunction with the waveforms of the key signals shown in FIG. 4. It is noted that this embodiment is also set forth in the exemplary context of CCM operation. In FIG. 4, Request1 represents a signal from the secondary-side controller 100, and Request2 represents a signal from primary-side controller 200.

At t1 and t2, with similarity to the embodiment of FIG. 3, the secondary-side controller 100 transmits an inquiry signal request1_0 to the primary-side controller 200 via the first isolator, in order to get ready to start a new switching period. When receiving the inquiry signal request1_0, the primary-side controller 200 carries out a self-check and enters a ready state, and transmits a feedback signal request2_0 to the secondary-side controller 100 via the second isolator. The secondary-side controller 100 then keeps the synchronous rectifier transistor SR turned off based on the feedback signal request2_0.

At t3, the primary-side controller 200 controls the primary transistor switch G1 to be turned on after the second predefined period of time following transmission of the feedback signal request2_0. It will be recognized that the second predefined period of time following transmission of the feedback signal request2_0 ends later than a time when the synchronous rectifier transistor SR is turned off. In particular, as shown in FIG. 4, the synchronous rectifier transistor SR may be turned off at t2, and the primary transistor switch G1 may be turned on at t3.

At t4 and t5, with similarity to the embodiment of FIG. 3, when a primary current Ipir in the primary-side circuit ramps up and raises to a second preset current, the primary-side controller 200 controls the primary transistor switch G1 to be turned off and transmits a second indication signal request2_1 via the second isolator. After that, upon receipt of the second indication signal request2_1, the secondary-side controller 100 controls the synchronous rectifier transistor SR to be turned on.

Afterwards, the same actions from t4 to t8 as those in the embodiment of FIG. 3 are repeated, and further description thereof is omitted herein.

It is noted that the embodiments disclosed herein are described in a progressive manner, with the description of each embodiment focusing on its differences from others. Reference can be made between the embodiments for their identical or similar features. Since the system embodiments correspond to the method embodiments, cross-reference can be made therebetween. While the invention has been described above with reference to preferred embodiments thereof, it is not limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent alternatives and modifications made to the foregoing embodiments based on the substantive disclosure of the invention without departing from the scope thereof fall within the scope.

It is understood that, as used herein, the terms "first", "second", "third" and the like are only meant to distinguish various components, elements, steps, etc. from each other rather than indicate logical or sequential orderings thereof, unless otherwise indicated or specified. Further, it is also recognized that, as used herein and in the appended claims, the singular forms "a" and "an" include the plural reference unless the context clearly dictates otherwise. Thus, for example, a reference to "a step" or "a device" is a reference to one or more steps or devices and may include sub-steps and sub-devices. All conjunctions used are to be understood in the most inclusive sense possible.

What is claimed is:

1. A control circuit for controlling an isolated switching-mode converter, wherein the isolated switching-mode converter comprises a primary-side circuit, a secondary-side circuit and a transformer coupled between the primary-side and secondary-side circuits, wherein the control circuit comprises:

a primary-side controller that comprises an output terminal electrically connected to a control terminal of a primary transistor switch in the primary-side circuit and is configured to output a control signal for the primary transistor switch; and a secondary-side controller that comprises an output terminal electrically connected to a control terminal of a synchronous rectifier transistor in the secondary-side circuit and is configured to output a control signal for the synchronous rectifier transistor, wherein the secondary-side controller is configured to transmit an inquiry signal after a first predefined period of time following turn-off of the synchronous rectifier transistor in a previous switching period, wherein the primary-side controller detects a state of the primary transistor switch after receiving the inquiry signal, and when confirming that the primary transistor switch is turned off, the primary-side controller transmits a feedback signal to the secondary-side controller, wherein the secondary-side controller keeps the synchronous rectifier transistor turned off based on the feedback signal, and wherein the primary-side controller responsively turns on the primary transistor switch in the primary-side circuit.

2. The control circuit of claim 1, wherein after keeping the synchronous rectifier transistor turned off based on the feedback signal, the secondary-side controller is further configured to transmit a first indication signal to the primary-side controller, thereby prompting the primary-side controller to control the primary transistor switch to be turned on.

3. The control circuit of claim 2, wherein the secondary-side controller is further configured to receive an output voltage of the isolated switching-mode converter, and wherein when the feedback signal is received and the output voltage of the switching-mode converter is below a predetermined voltage, the secondary-side controller is configured to transmit the first indication signal.

4. The control circuit of claim 1, wherein the primary-side controller is configured to turn on the primary transistor switch after a second predefined period of time following transmission of the feedback signal, wherein the second predefined period of time ends later than a time when the synchronous rectifier transistor is turned off.

5. The control circuit of claim 1, wherein the primary-side controller is further configured to transmit a second indication signal when the primary transistor switch is turned off, thereby prompting the secondary-side controller to control the synchronous rectifier transistor to be turned on.

6. The control circuit of claim 1, wherein the secondary-side controller is further configured to detect a voltage signal from a secondary-side winding in the transformer and to turn on the synchronous rectifier transistor when the voltage signal from the secondary-side winding drops to a predetermined value as a result of the primary transistor switch being turned off.

7. The control circuit of claim 1, wherein the secondary-side controller is further configured to detect a secondary current in the secondary-side circuit and to turn off the synchronous rectifier transistor when detecting that the secondary current drops to a first preset current during conduction of the synchronous rectifier transistor.

8. The control circuit of claim 1, wherein the secondary-side controller comprises a first logic control module, a first transmitter module and a first receiver module, wherein:

a first output terminal of the first logic control module is electrically connected to the control terminal of the synchronous rectifier transistor and is configured to provide the control signal to the synchronous rectifier transistor;

a second output terminal of the first logic control module is electrically connected to the first transmitter module and is configured to transmit a generated signal to the primary-side controller via the first transmitter module; and the first input terminal of the first logic control module is electrically connected to the first receiver module and is configured to receive a signal from the primary-side controller via the first receiver module.

9. The control circuit of claim 1, wherein the primary-side controller comprises a second logic control module, a second receiver module and a second transmitter module, wherein:

an input terminal of the second logic control module is connected to the second receiver module and is configured to receive a signal from the secondary-side controller via the second receiver module;

a first output terminal of the second logic control module is electrically connected to the control terminal of the primary transistor switch and is configured to provide the control signal to the primary transistor switch; and a second output terminal of the second logic control module is electrically connected to the second transmitter module and is configured to transmit a generated signal to the secondary-side controller via the second transmitter module.

10. The control circuit of claim 1, further comprising an isolator that is coupled between the primary-side controller and the secondary-side controller and is configured to transmit signals between the secondary-side controller and the primary-side controller.

11. The control circuit of claim 1, further comprising a first isolator and a second isolator, with each coupled between the primary-side controller and the secondary-side controller, wherein the first isolator is configured to couple a signal from the secondary-side controller to the primary-side controller, and wherein the second isolator is configured to couple a signal from the primary-side controller to the secondary-side controller.

12. A control method for an isolated switching-mode converter, wherein the isolated switching-mode converter comprises a primary-side circuit, a secondary-side circuit and a transformer coupled between the primary-side and secondary-side circuits, wherein the control method comprises:

at the secondary-side controller, transmitting an inquiry signal after a first predefined period of time following turn-off of a synchronous rectifier transistor in a previous switching period;

at the primary-side controller, receiving the inquiry signal and then detecting a state of a primary transistor switch in the primary-side circuit, wherein when the primary transistor switch is turned off, the primary-side controller transmits a feedback signal to the secondary-side controller;

at the secondary-side controller, receiving the feedback signal and keeping the synchronous rectifier transistor in the secondary-side circuit turned off; and at the primary-side controller, providing a turn-on signal to the primary transistor switch, thereby turning on the primary transistor switch.

13. The control method of claim 12, wherein the secondary-side controller further transmits a first indication signal to the primary-side controller after keeping the synchronous rectifier transistor turned off based on the feedback signal, and wherein the primary-side controller controls the primary transistor switch to be turned on based on the first indication signal.

14. The control method of claim 13, wherein the secondary-side controller further receives an output voltage of the isolated switching-mode converter and transmits the first indication signal when the feedback signal is received and the output voltage of the switching-mode converter is below a predetermined voltage.

15. The control method of claim 12, wherein the primary-side controller provides a turn-on signal to the primary transistor switch after a second predefined period of time following transmission of the feedback signal, thereby turning on the primary transistor switch, wherein the second predefined period of time ends later than a time when the synchronous rectifier transistor is turned off.

16. The control method of claim 12, wherein the primary-side controller transmits a second indication signal when the primary transistor switch is turned off, and wherein the secondary-side controller provides a turn-on signal to the synchronous rectifier transistor based on the second indication signal, thereby turning on the synchronous rectifier transistor.

17. The control method of claim 12, wherein the secondary-side controller detects a voltage signal from a secondary-side winding in the transformer and provides a turn-on signal to the synchronous rectifier transistor when the voltage signal from the secondary-side winding drops to a predetermined value as a result of the primary transistor switch being turned off, thereby turning on the synchronous rectifier transistor.

18. The control method of claim 12, wherein the secondary-side controller further detects a secondary current in the secondary-side circuit and controls the synchronous rectifier transistor to be turned off when detecting that the secondary current drops to a first preset current during conduction of the synchronous rectifier transistor.

19. The control method of claim 12, comprising:

at the secondary-side controller, transmitting the inquiry signal to the primary-side controller after the first predefined period of time following the turn-off of the synchronous rectifier transistor in the previous switching period, so as to prepare for starting a new switching period;

at the primary-side controller, after receiving the inquiry signal, transmitting the feedback signal to the secondary-side controller;

at the secondary-side controller, after receiving the feedback signal, keeping the synchronous rectifier transistor turned off and transmitting a first indication signal to the primary-side controller when detecting that an output voltage of the isolated switching-mode converter drops to a predetermined voltage;

at the primary-side controller, receiving the first indication signal and turning on the primary transistor switch, thereby starting a current switching period;

at the primary-side controller, upon a primary current in the primary-side circuit increasing to a second preset current, controlling the primary transistor switch to be turned off and transmitting a second indication signal;

at the secondary-side controller, after receiving the second indication signal, controlling the synchronous rectifier transistor to be turned on; and at the secondary-side controller, after demagnetization of the secondary-side circuit is complete, controlling the synchronous rectifier transistor to be turned off, getting ready for starting a next switching period.

20. An isolated switching-mode converter comprising the control circuit of claim 1.

* * * * *